United States Patent
Steckel et al.

(10) Patent No.: US 12,480,813 B2
(45) Date of Patent: Nov. 25, 2025

(54) MULTISPECTRAL IMAGER

(71) Applicants: STMicroelectronics (Grenoble 2) SAS, Grenoble (FR); STMicroelectronics, Inc., Coppell, TX (US)

(72) Inventors: Jonathan Steckel, Corenc (FR); Andras G. Pattantyus-Abraham, Menlo Park, CA (US)

(73) Assignees: STMicroelectronics (Grenoble 2) SAS, Grenoble (FR); STMicroelectronics, Inc., Coppell, TX (US)

( * ) Notice: Subject to any disclaimer, the term of this patent is extended or adjusted under 35 U.S.C. 154(b) by 307 days.

(21) Appl. No.: 18/108,110

(22) Filed: Feb. 10, 2023

(65) Prior Publication Data
US 2023/0258498 A1    Aug. 17, 2023

(30) Foreign Application Priority Data
Feb. 11, 2022   (FR) ...................................... 2201217

(51) Int. Cl.
*G01J 3/28*     (2006.01)
*H10F 77/14*    (2025.01)

(52) U.S. Cl.
CPC ........ *G01J 3/2823* (2013.01); *H10F 77/1433* (2025.01); *G01J 2003/2826* (2013.01)

(58) Field of Classification Search
CPC .......... G01J 3/0259; G01J 3/12; G01J 3/2803; G01J 3/2823; G01J 2003/2826; G01J 2003/1213; G01J 2003/2813; G01J 2003/2806; H10F 77/1433
See application file for complete search history.

(56) References Cited

U.S. PATENT DOCUMENTS

| | | | |
|---|---|---|---|
| 2005/0051766 A1* | 3/2005 | Stokes | H01S 5/341 257/17 |
| 2013/0154040 A1 | 6/2013 | Huh et al. | |
| 2016/0087164 A1* | 3/2016 | Kawano | C09K 11/62 257/98 |
| 2018/0031912 A1* | 2/2018 | Zhang | G02F 1/1335 |
| 2018/0061814 A1* | 3/2018 | Lee | H05B 45/12 |
| 2018/0102449 A1* | 4/2018 | Pschenitzka | C09K 11/02 |
| 2018/0197956 A1* | 7/2018 | Lee | H10F 30/21 |

FOREIGN PATENT DOCUMENTS

WO    2007112088 A3    10/2007

OTHER PUBLICATIONS

NPI Search Report and Written Opinion for priority application, FR 2201217, report dated Sep. 28, 2022, 10 pgs.
Venettacci, Carlo, et al.: "Algorithm-based spectrometer exploiting colloïdal PbS quantum dots," Photonics and Nanostructures, Fundamentals and Applications 43 (2021), 9 pgs.
Zhang, Shuo, et al.: "Advances of Sensitive Infrared Detectors with HgTe Colloïdal Quantum Dots," Coatings 2020, 13 pgs.

* cited by examiner

*Primary Examiner* — Sang H Nguyen
(74) *Attorney, Agent, or Firm* — Crowe & Dunlevy LLC

(57) ABSTRACT

An imaging device includes a first layer made of quantum dots and a second layer including at least two filter regions extending over the first layer. The at least two filter regions are configured to transmit distinct wavelengths. The quantum dots of the first layer are configured to generate charges upon reception of light in the distinct wavelengths.

13 Claims, 6 Drawing Sheets

MULTISPECTRAL IMAGER

PRIORITY CLAIM

This application claims the priority benefit of French Application for Patent No. 2201217, filed on Feb. 11, 2022, the content of which is hereby incorporated by reference in its entirety to the maximum extent allowable by law.

TECHNICAL FIELD

The present disclosure relates generally to optoelectronic devices and, more particularly, to multispectral imagers.

BACKGROUND

Multispectral imaging captures image data within specific wavelength ranges across the electromagnetic spectrum. The wavelengths may be separated by filters that are sensitive to particular wavelengths, including light from frequencies beyond the visible light range, i.e. infrared and ultra-violet. Multispectral imaging measures light in a small number of spectral bands.

There is a need in the art to address all or some of the drawbacks of known multispectral imagers.

SUMMARY

One embodiment provides a device comprising a first layer made of quantum dots and at least two filter regions resting on the first layer, the at least two filter regions being configured to transmit distinct wavelengths, the first layer being configured to generate charges upon reception of said wavelengths.

According to another embodiment, the imager comprises at least two pixels, each pixel comprising at least part of a filter region and part of the first layer.

According to another embodiment, the first layer is shared by all the pixels.

According to another embodiment, the imager comprises a second insulating layer and vias extending through the second insulating layer, the portion of the first layer of each pixel resting on a via.

According to another embodiment, the first layer comprises as many types of quantum dots as of distinct wavelengths, each type of quantum dots being able to generate charges upon reception of light of one of said wavelengths.

According to another embodiment, the different types of quantum dots are mixed together in the first layer.

According to another embodiment, the quantum dots of the first layer are substantially identical and are able to generate charges upon reception of light of all the distinct wavelengths.

According to another embodiment, the first layer is a stack of third layers, at least two third layers being configured to generate charges upon reception of different wavelengths among the distinct wavelengths.

According to another embodiment, each pixel comprises a portion of each third layer of the first layer.

According to another embodiment, the portions of the first layer in each pixel are identical.

According to another embodiment, the portion of the first layer in each pixel is a region configured to generate charges upon reception of the wavelength transmitted by the filter of the pixel.

According to another embodiment, the filters are made of quantum dots.

According to another embodiment, the filters are in a same fourth layer.

According to another embodiment, the third layer of filters is separated from the first layer by a fifth metallic layer.

Another embodiment provides a multispectral imager comprising a device as described before.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
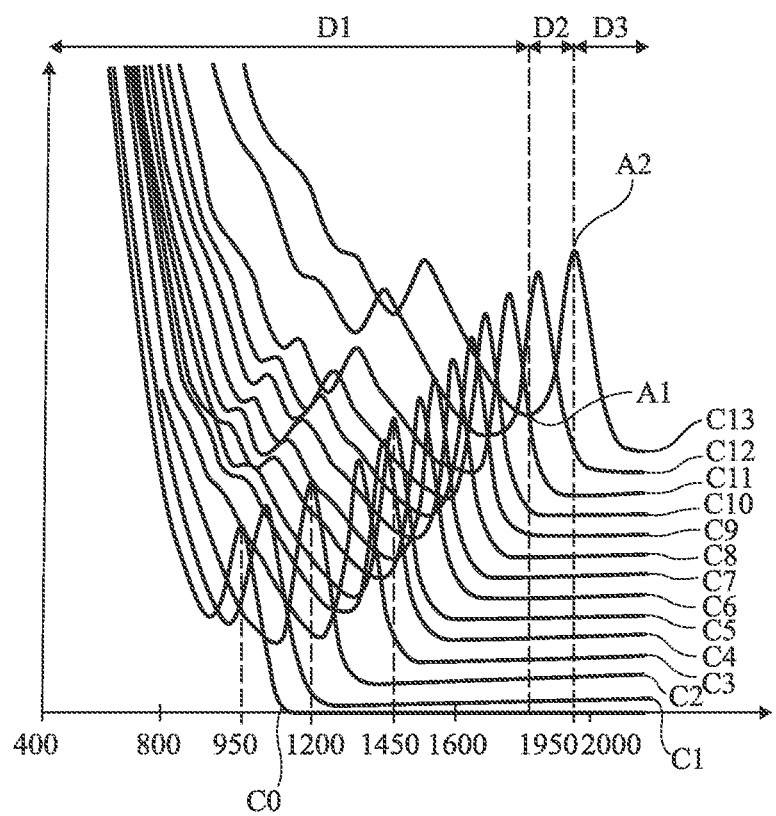
FIG. 1 illustrates the absorbance of quantum dots of different sizes depending on the wavelength.

FIG. 1 illustrates schematically the absorbance of quantum dots of different sizes depending on wavelength (in nanometers).

A quantum dot, or semiconductor nanoparticle, is a nanoscopic material structure which produces electron-hole pairs given the incidence of photons onto the nanoscopic material structure. In this manner, it is possible to create detecting elements such as photodetectors for example, on the basis of semiconductor nanoparticles.

A quantum dot comprises a semiconductor core. A quantum dot can also comprise a shell, preferably in a semiconductor material, surrounding the core in order to protect and passivate the core. A quantum dot further comprises ligands, organic aliphatics, organometallic, or inorganic molecules that extend from the shell and passivate, protect, and functionalize the semiconductor surface.

The composition of a quantum dot can be chosen among the following materials. The core is, for example, made of a material among the following or an alloy of materials among the following: CdSe, CdS, CdTe, CdSeS, CdTeSe, AgS, ZnO, ZnS, ZnSe, CuInS, CuInSe, CuInGaS, CuInGaSe, PbS, PbSe, PbSeS, PbTe, InAsSb, InAs, InSb, InGaAs, InP, InGaP, InAlP, InGaAlP, InZnS, InZnSe, InZnSeS, HgTe, HgSe, HgSeTe, Ge, Si. The shell is, for example, made of a material among the following or an alloy of materials among the following: CdSe, CdS, CdTe, CdSeS, CdTeSe, AgS, ZnO, ZnS, ZnSe, CuInS, CuInSe, CuInGaS, CuInGaSe, PbS, PbSe, PbSeS, PbTe, InAsSb, InAs, InSb, InGaAs, InP, InGaP, InAlP, InGaAlP, InZnS, InZnSe, InZnSeS, HgTe, HgSe, HgSeTe, Ge, Si.

Preferably, all the dimensions of the core are lower than 20 nm, for example in the range from 2 to 15 nm. In particular, the diameter of each quantum dot is preferably in the range from 2 to 15 nm. By diameter, we mean the diameter of the smallest sphere in which the quantum dot can be inscribed.

FIG. 1 comprises several curves C0, C1, C2, C3, C4, C5, C6, C7, C8, C9, C10, C11, C12 and C13, each corresponding to quantum dots differing in size and/or composition. For each curve, FIG. 1 represents the absorbance in function of the wavelength of the received light. The dimensions, or size, composition, and shape of the core of a quantum dot determine the wavelength of the working wavelength of a quantum dot, in other words of the light absorbed generating the election-hole pairs in a photodetector.

For example, the curves C0 to C13 represented in FIG. 1 correspond to quantum dots having the same composition but with various sizes. All curves have substantially the same variations but are translated as the size of the quantum dots decrease. In the example of FIG. 1, the curve C0 corresponds to a quantum dot having the largest diameter among the quantum dots corresponding to the curves C0 to C13. The curve C1 corresponds to a quantum dot having a diameter smaller than the quantum dot corresponding to curve C0. In that way, the diameter of the quantum dots corresponding respectively to the curves C0 to C13 decreases as the number of the curve increases. Therefore, the quantum dot corresponding to the curve C13 has the smallest diameter among the quantum dots corresponding to the curves C0 to C13.

Only the variations of the curve C13 are described. However, the variations of each curve C0 to C13 are substantially identical to the variations of curve C13.

During a first range of wavelengths D1, the curve C13 generally decreases, in other words, the absorbance of the corresponding quantum dot decreases with increase in wavelength until reaching a value, or minimum, A1 corresponding to the minimum value within the wavelength range D1. During a second range of wavelength D2, the curve C13 increases, in other words, the absorbance of the corresponding quantum dot increases with increase in wavelength until reaching a value, or maximum, A2 corresponding to the maximum value within the wavelength range D2. During a third range of wavelengths D3, the curve C13 generally decreases, in other words, the absorbance of the corresponding quantum dot decreases with increase in wavelength (for example, to a level below the value A1). The maximum A2 constitute the main maximum.

Preferably, we consider that a curve, and therefore a size of quantum dot for a given composition, is associated with the wavelength corresponding to the maximum A2. In other words, a size and a composition of quantum dot is preferred for the production of charges upon receiving light at the wavelength of the maximum A2. For example, the size and composition of the quantum dot corresponding to the curve C13 is preferred for a working wavelength of 1950 nm.

It is therefore possible to choose a size and a composition of quantum dots able to absorb, with a significant absorbance, any wavelength in a large range of wavelengths. For example, it is possible to find a size and a composition of quantum dots having a working wavelength higher than 300 nm, for example comprised between 300 nm and 3000 nm, which includes the visible and the infrared.

Figure 2:
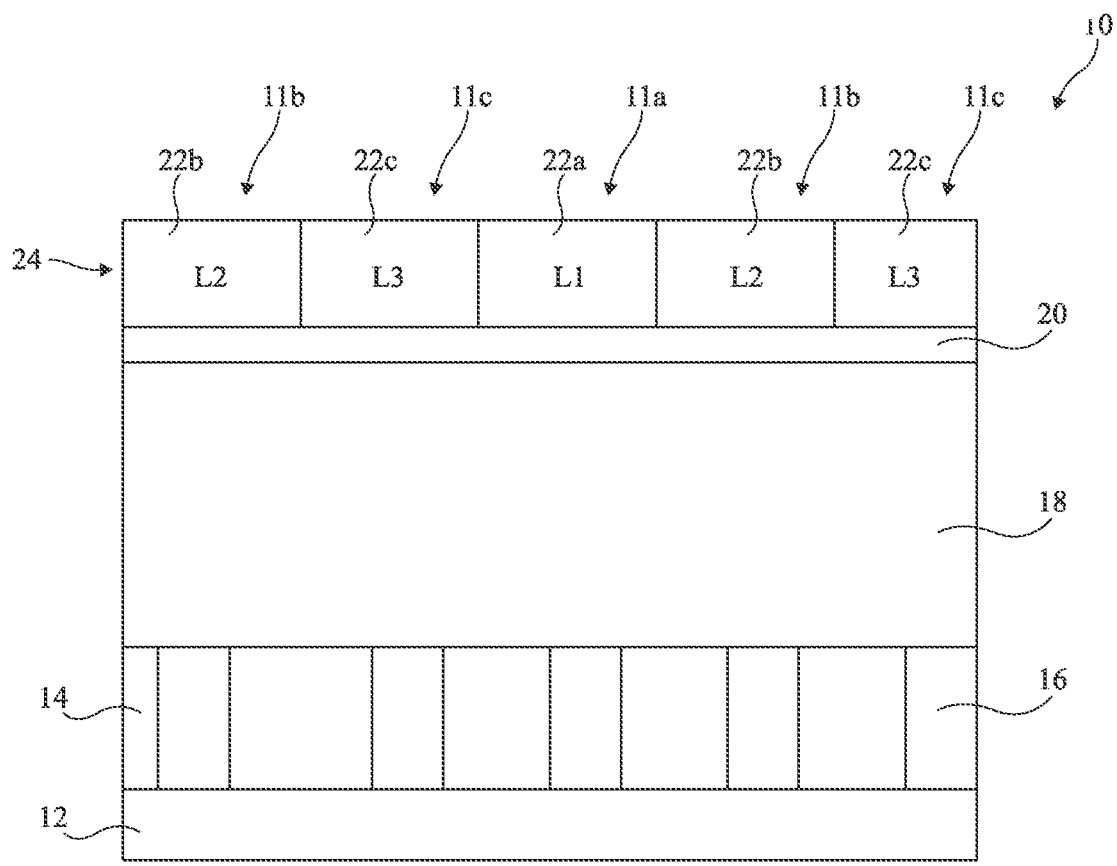
FIG. 2 illustrates an embodiment of a multispectral imager.

FIG. 2 illustrates an embodiment of a multispectral imager 10. The imager 10 comprises several pixels 11. More precisely, FIG. 2 represents a part of an imager 12 comprising five pixels.

The imager 10 is configured to have at least two distinct working wavelengths, in other words to capture image data for at least two distinct wavelengths or distinct ranges of wavelengths. For example, the two distinct wavelengths or range of wavelengths are separated by at least on wavelength which is not a working wavelength of the imager. For example, the imager 10 is configured to capture image data for three working wavelengths L1, L2 and L3. Preferably, the wavelength L1 is lower than the wavelength L2, and the wavelength L2 is lower than the wavelength L3. The pixels 11a are configured to capture image data for the wavelength L1. The pixels 11b are configured to capture image data for the wavelength L2. The pixels 11c are configured to capture image data for the wavelength L3.

The imager 10 comprises a substrate, or support, 12. The substrate 10 is, for example, made of semiconductor material, for example silicon. The substrate 10 is, for example, made of insulating layers, for example in silicon oxide, and conductive tracks and vias, for example in copper.

The substrate 12 is covered by an insulation layer 14. The layer 14 is, for example, in silicon oxide. Conductive vias 16 extend through the layer 14. The vias 16 are, for example, made of copper or tungsten. The imager 10 comprises at least one via 16 for each pixel 11a, 11b, 11c. One via 16 is located in regard of the location of each pixel 11a, 11b, 11c. The via of each pixel corresponds to an electrode of the pixel.

The imager 10 comprises a layer 18. The layer 18 covers the layer 14 and all the vias 16 corresponding to the pixels 11a, 11b, 11c. More precisely, the layer 18 covers all the locations of the pixels 11a, 11b, 11c. The layer 18 is preferably continuous on the locations of all the pixels. The layer 18 is preferably in contact with the vias 16.

The layer 18 is made of quantum dots. Preferably, the quantum dots are fixed together and to the layer 14 by a resin, or a matrix. Preferably, the layer 18 comprises only the quantum dots and the resin.

According to the embodiment of FIG. 2, all the quantum dots of the layer 18 are substantially identical. All the quantum dots of the layer 18 have substantially the same size and are made of the same components. For example, all the quantum dots of the layer 18 are in lead sulphide (PbS). It will be considered that the layer 18 thus provides a uniform layer of a single type (material and size) of quantum dots.

The layer 18 is configured to produce electrical charges given the incidence of photons of at least the working wavelengths L1, L2, L3 of the imager 10. In order to produce such charges, the size and composition of the quantum dots of the layer 18 are chosen so that the layer 18 is able to absorb all the working wavelengths. For example, the size and composition of the quantum dots are chosen so that the absorbance of each working wavelength is superior or equal to the absorbance of the preferred curve for this wavelength.

For example, if the wavelength L1, L2 and L3 are respectively equal to 950 nm, 1200 nm and 1450 nm, the preferred curve, and therefore the preferred size and composition, for the wavelength L1 would, for example, be the curve C0 of FIG. 1. The preferred curve, and therefore the preferred size and composition, for the wavelength L2 would, for example, be the curve C2. The preferred curve, and therefore the preferred size and composition, for the wavelength L3 would, for example, be the curve C5. In this example, the quantum dots of the layer 18 are, for example, quantum dots corresponding to curve C11 or quantum dots having the same composition and a smaller diameter than the quantum dots corresponding to the curve C11. Indeed, for the wavelength L1, the absorbance of curve C11 is higher than the absorbance of curve C0, for the wavelength L2, the absorbance of curve C11 is higher than the absorbance of curve C2, and for the wavelength L3, the absorbance of curve C11 is higher than the absorbance of curve C5.

The imager 10 comprises a layer 20. The layer 20 is a conductive layer, for example a metallic layer. The layer 20 preferably covers the entire layer 18. The layer 20 covers at least the part of the layer 18 corresponding to the pixels 11a, 11b, 11c. The layer 20 is preferably in contact, at least in the pixels 11, with the layer 18. The layer 20 corresponds to an electrode common to all the pixels 11a, 11b, 11c. For each pixel 11a, 11b, 11c, a voltage can therefore be applied or measured between the via 16 of the pixel 11a, 11b, 11c and the layer 20.

The imager 10 comprises filters 22a, 22b and 22c. The imager 10 comprises as many types of filters as the number of working wavelengths. In other words, each working wavelength is transmitted by one of the filters. The filters 22a filter out, for example, all wavelengths except the wavelength L1. The filters 22b filter out, for example, all wavelengths except the wavelength L2. The filters 22c filter out, for example, all wavelengths except the wavelength L3. In other words, the filters 22a, 22b and 22c for example respectively transmit, preferably solely, the wavelength L1, L2 and L3.

Each filter 22a, 22b or 22c is located in a pixel. Each pixel comprises a filter 22a, 22b, 22c, preferably a single filter 22a, 22b and 22c. Each pixel 11a comprises a filter 22a. Each pixel 11b comprises a filter 22b. Each pixel 11c comprises a filter 22c.

Each pixel 11a, 11b, 11c comprises a via 16, a part of the layer 18, a part of the layer 20 and a filter 22a, 22b or 22c. In the pixels 11a comprising a filter 22a, the voltage measured between the via 16 and the layer 20 is representative of the quantity of light at the wavelength L1 is received by the pixel 11a. In the pixels 11b comprising a filter 22b, the voltage measured between the via 16 and the layer 20 is representative of the quantity of light at the wavelength L2 is received by the pixel 11b. In the pixels 11c comprising a filter 22c, the voltage measured between the via 16 and the layer 20 is representative of the quantity of light at the wavelength L3 is received by the pixel 11c.

The filters 22a, 22b and 22c are, for example, located in a same layer 24. The filters 22a, 22b and 22c are, for example, adjacent to each other in the layer 24. The filters are, for example, separated from each other by walls, not represented. The walls are, for example, opaque.

The imager 10 comprises, for example, other layers, not represented, comprised between the layer 20 and the filters 22a, 22b, 22c.

The filters 22a, 22b, 22c can be made of different technologies. For example, the filters can be made of organic or inorganic molecules, polymers or inorganic materials. The filters can be made of stacks of thin films of inorganic materials having different refractive indexes. Another example of filter that can be used to form the filters 22a, 22b and 22c is described in relation with FIG. 6.

Figure 3:
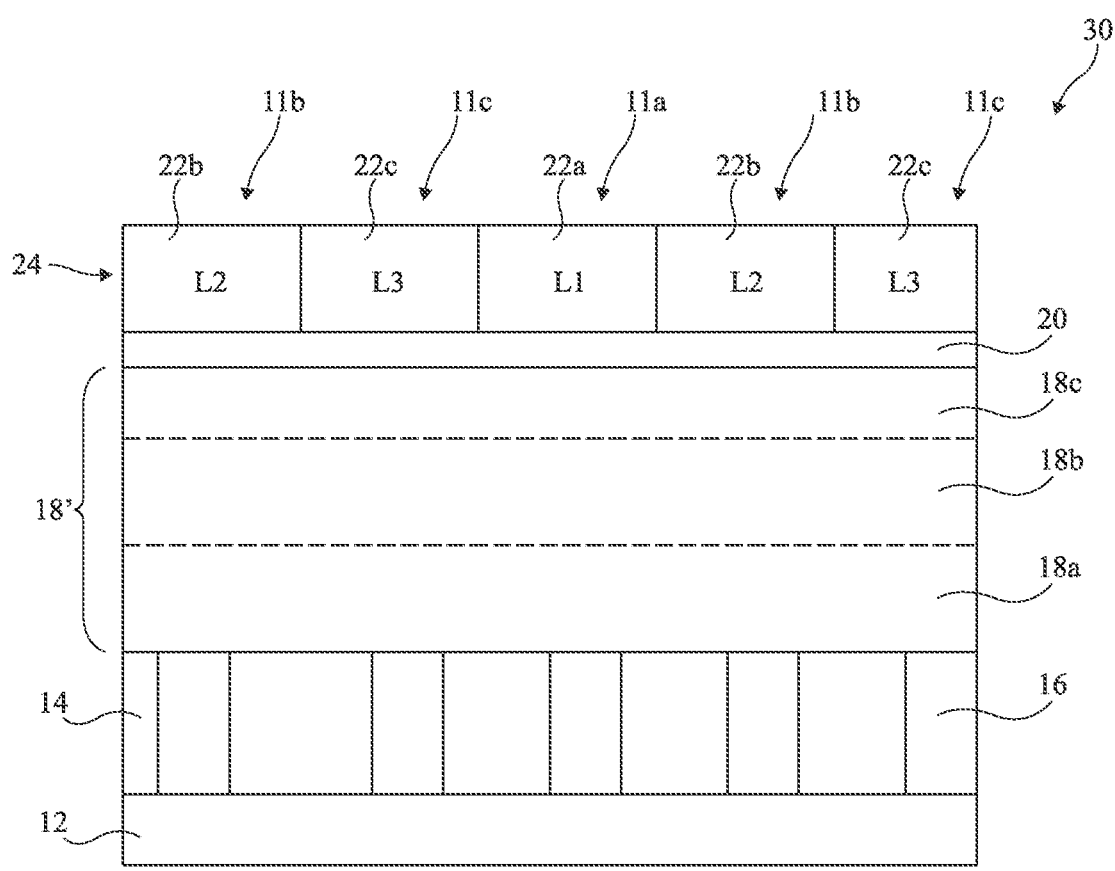
FIG. 3 illustrates another embodiment of a multispectral imager.

FIG. 3 illustrates another embodiment of a multispectral imager 30.

The imager 30 comprises the elements of the imager 10 of FIG. 2. Those elements will not be described again. The imager 30 differs from the imager 10 of FIG. 2 in that the layer 18 is replaced by a stack 18'. The stack 18' covers, like the layer 18 of imager 10, the layer 14 and the vias 16. The stack 18' is in contact with the vias 16. The stack 18' is, like the layer 18 of imager 10, covered by, and preferably in contact with, the layer 20.

The stack 18' comprises layers 18a, 18b and 18c. The stack 18', for example, comprises as many layers as the number of wavelengths of the imager. Therefore, the imager 30, having, like the imager 10, three working wavelengths L1, L2, L3, comprises three layers 18a, 18b and 18c.

The layers 18a, 18b, 18c are made of quantum dots. The quantum dots of each layer are fixed together and to the layer 14, for example by a resin, or a matrix. Preferably, each layer 18a, 18b, 18c comprises only the quantum dots and the resin. The quantum dots of each layer 18a, 18b and 18c are preferably identical. The quantum dots of each of the layers 18a, 18b and 18c are preferably different from the quantum dots of the other layers 18a, 18b, 18c. Therefore, the size and/or the composition of the quantum dots of each of the layers 18a, 18b and 18c are preferably different from the size and/or the composition of the quantum dots of the other layers 18a, 18b, 18c. Thus, in this case, each of the layers 18a, 18b, 18c provides a uniform layer of a single type (material and size) of quantum dots.

More generally, the stack 18' comprises at least one layer 18a, at least one layer 18b and at least one layer 18c.

The layer 18a is the bottom layer of the stack 18'. The layer 18a covers the layer 14 and is preferably in contact with the vias 16. Each pixel 11a, 11b, 11c comprises a part of the layer 18a. The layer 18a is covered by the layer 18b. Preferably, the layer 18b covers entirely the layer 18a. The layer 18a and the layer 18b are, for example, in contact. Preferably, a bottom face of the layer 18b is entirely in contact with a top face of the layer 18a. Each pixel 11a, 11b, 11c comprises a part of the layer 18b. The layer 18b is covered by the layer 18c. Preferably, the layer 18c covers entirely the layer 18b. The layers 18b and 18c are, for example, in contact. Preferably, a bottom face of the layer 18c is entirely in contact with a top face of the layer 18b. Each pixel comprises a part of the layer 18c. Each pixel 11a, 11b, 11c comprises a stack of a part of layer 18a, a part of layer 18b and a part of layer 18c.

The layer 18a is configured to produce charges when receiving light of a working wavelength, here the wavelength L1. The layer 18b is configured to produce charges when receiving light of another working wavelength, here the wavelength L2. The layer 18c is configured to produce charges when receiving light of a working wavelength, here the wavelength L3.

In the pixels 11a comprising the filters 22a, only the light of the wavelength L1 passes through in order to reach the stack 18'. Said light interacts with the layer 18a in order to generate charges. Said light does not interact with the layers 18b and 18c. The voltage measured between the electrodes of said pixel is representative of the quantity of light of the wavelength L1 received in the pixel 11a.

Similarly, in the pixels 11b comprising the filters 22b, only the light of the wavelength L2 passes through in order to reach the stack 18'. Said light interacts with the layer 18b in order to generate charges. Said light does not interact with the layers 18a and 18c. The voltage measured between the electrodes of said pixel is representative of the quantity of light of the wavelength L2 received in the pixel 11b.

Similarly, in the pixels 11c comprising the filters 22c, only the light of the wavelength L3 passes through in order to reach the stack 18'. Said light interacts with the layer 18c in order to generate charges. Said light does not interact with the layers 18a and 18b. The voltage measured between the electrodes of said pixel 11c is representative of the quantity of light of the wavelength L3 received in the pixel 11c.

The layer 18a is, for example, made of quantum dots having the preferred curve for the generation of charges at the wavelength L1, in other words the quantum dots corresponding to the curve C0 of FIG. 1, if the wavelength L1 is equal to 950 nm. Preferably, the layer 18a is made of quantum dots whose curve of absorbance has a maximum, for example a local maximum at the wavelength L1. Alternatively, the layer 18a is made of quantum dots having an absorbance for the wavelength L1 higher than the absorbance for the wavelength L1 of the quantum dots corresponding to the preferred curve for the wavelength L1, here the curve C0, for example the quantum dots corresponding to any of curves C3 to C13.

Similarly, the layer 18b is, for example, made of quantum dots having the preferred curve for the generation of charges at the wavelength L2, in other words the quantum dots corresponding to the curve C2 of FIG. 1, if the wavelength L2 is equal to 1200 nm. Preferably, the layer 18b is made of quantum dots whose curve of absorbance has a maximum, for example a local maximum at the wavelength L2. Alternatively, the layer 18b is made of quantum dots having an absorbance for the wavelength L2 higher than the absorbance for the wavelength L2 of the quantum dots corresponding to the preferred curve for the wavelength L2, here the curve C2, for example the quantum dots corresponding to any of curves C7 to C13.

Similarly, the layer 18c is, for example, made of quantum dots having the preferred curve for the generation of charges at the wavelength L3, in other words the quantum dots corresponding to the curve C5 of FIG. 1, if the wavelength L3 is equal to 1450 nm. Preferably, the layer 18c is made of quantum dots whose curve of absorbance has a maximum, for example a local maximum at the wavelength L3. Alternatively, the layer 18c is made of quantum dots having an absorbance for the wavelength L3 higher than the absorbance for the wavelength L3 of the quantum dots corresponding to the preferred curve for the wavelength L3, here the curve C5, for example the quantum dots corresponding to any of curves C11 to C13.

Preferably, the layer configured to generate charges upon reception of light of the lowest wavelength, here the layer 18a configured to generate charges upon reception of light of the wavelength L1, is the closest to the substrate 12, in other words, the farthest from the filters 22a, 22b, 22c. The layer configured to generate charges upon reception of light of the highest wavelength, here the layer 18c configured to generate charges upon reception of light of the wavelength L3, is the farthest to the substrate 12, in other words, the closest from the filters 22a, 22b, 22c.

More generally, given two layers of the stack 18', the layer configured to generate charges upon reception of light of the lowest wavelength is preferably the closest of the two to the substrate 12, in other words, the farthest of the two from the filters 22a, 22b, 22c. In other words, a layer of the stack 18' is preferably separated from the substrate only by layers configured to generate charges upon reception of light of lower wavelengths and is preferably separated from the filters only by layers configured to generate charges upon reception of light of higher wavelengths.

Figure 4:
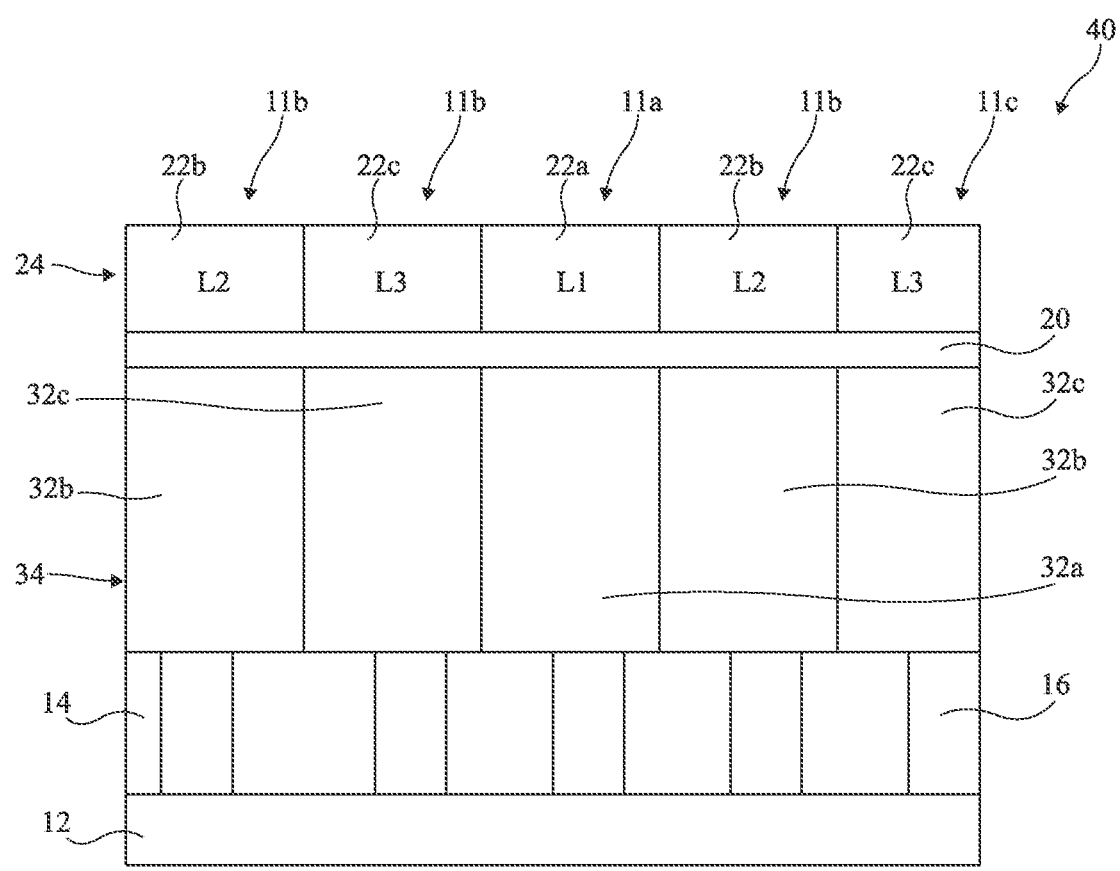
FIG. 4 illustrates another embodiment of a multispectral imager.

FIG. 4 illustrates another embodiment of a multispectral imager 40.

The imager 40 comprises the elements of the imager 10 of FIG. 2. Those elements will not be described again. The imager 40 differs from the imager 10 of FIG. 2 in that the layer 18 is replaced by quantum dot-based regions 32a, 32b, 32c.

The imager 40 comprises as many types of regions as the number of working wavelengths. In the example of FIG. 4, the imager 40 has three working wavelengths L1, L2 and L3 and comprises three types of regions, the regions 32a, the regions 32b and the regions 32c.

Each pixel 11a, 11b, 11c comprises a region 32a, 32b, 32c, preferably only one region 32a, 32b, 32c. Each pixel 11a comprises a region 32a. Each pixel 11b comprises a region 32b. Each pixel 11c comprises a region 32c. Each region 32a, 32b and 32c extends, for example, in regard of at least the entirety of the filter of a pixel, preferably only in regard of a filter of a single pixel. For example, the lateral walls of each region are substantially coplanar with the lateral walls of a filter.

Each region 32a, 32b, 32c is made of quantum dots. The quantum dots of each region are fixed together and to the layer 14, for example by a resin, or a matrix. Preferably, each region 32a, 32b, 32c comprises only the quantum dots and the resin. The quantum dots of each region 32a, 32b, 32c are preferably identical. The quantum dots of each of the regions 32a, 32b, 32c are preferably different from the quantum dots of the other regions 32a, 32b, 32c. Therefore, the size and/or the composition of the quantum dots of each of the regions 32a, 32b, 32c are preferably different from the size and/or the composition of the quantum dots of the other regions 32a, 32b, 32c.

Each region 32a, 32b and 32c is configured to produce electrical charges upon reception of light of the working wavelength of the corresponding pixel 11a, 11b, 11c. The regions 32a are configured to produce electrical charges upon reception of light of the working wavelength L1. The regions 32b are configured to produce electrical charges upon reception of light of the working wavelength L2. The regions 32c are configured to produce electrical charges upon reception of light of the working wavelength L3.

The region 32a is, for example, made of quantum dots having the preferred curve for the generation of charges at the wavelength L1, in other words the quantum dots corresponding to the curve C0 of FIG. 1, if the wavelength L1 is equal to 950 nm. Preferably, the region 32a is made of quantum dots whose curve of absorbance has a maximum, for example a local maximum at the wavelength L1. Alternatively, the region 32a is made of quantum dots having an absorbance for the wavelength L1 higher than the absorbance for the wavelength L1 of the quantum dots corresponding to the preferred curve for the wavelength L1, here the curve C0, for example the quantum dots corresponding to any of curves C3 to C13.

Similarly, the region 32b is, for example, made of quantum dots having the preferred curve for the generation of charges at the wavelength L2, in other words the quantum dots corresponding to the curve C2 of FIG. 1, if the wavelength L2 is equal to 1200 nm. Preferably, the region 32b is made of quantum dots whose curve of absorbance has a maximum, for example a local maximum at the wavelength L2. Alternatively, the region 32b is made of quantum dots having an absorbance for the wavelength L2 higher than the absorbance for the wavelength L2 of the quantum dots corresponding to the preferred curve for the wavelength L2, here the curve C2, for example the quantum dots corresponding to any of curves C7 to C13.

Similarly, the region 32c is, for example, made of quantum dots having the preferred curve for the generation of charges at the wavelength L3, in other words the quantum dots corresponding to the curve C5 of FIG. 1, if the wavelength L3 is equal to 1450 nm. Preferably, the region 32c is made of quantum dots whose curve of absorbance has a maximum, for example a local maximum at the wavelength L3. Alternatively, the region 32c is made of quantum dots having an absorbance for the wavelength L3 higher than the absorbance for the wavelength L3 of the quantum dots corresponding to the preferred curve for the wavelength L3, here the curve C5, for example the quantum dots corresponding to any of curves C11 to C13.

Each region 32a, 32b and 32c extends from the layer 20, more precisely from the bottom face of the layer 20, to the layer 14 and the vias 16, more precisely to the top face of the layer 14 and of the vias 16. Each of the regions 32a, 32b, 32c is in contact with a via 16, preferably with only a via 16. Each of the regions 32a, 32b, 32c is in contact with the via 16 of the pixel in which the region 32a, 32b, 32c is located.

Preferably, the regions 32a, 32b and 32c are adjacent and in contact with each other. Preferably, the regions 32a, 32b and 32c are in a same layer 34 comprising only quantum dot-based regions.

Figure 5:
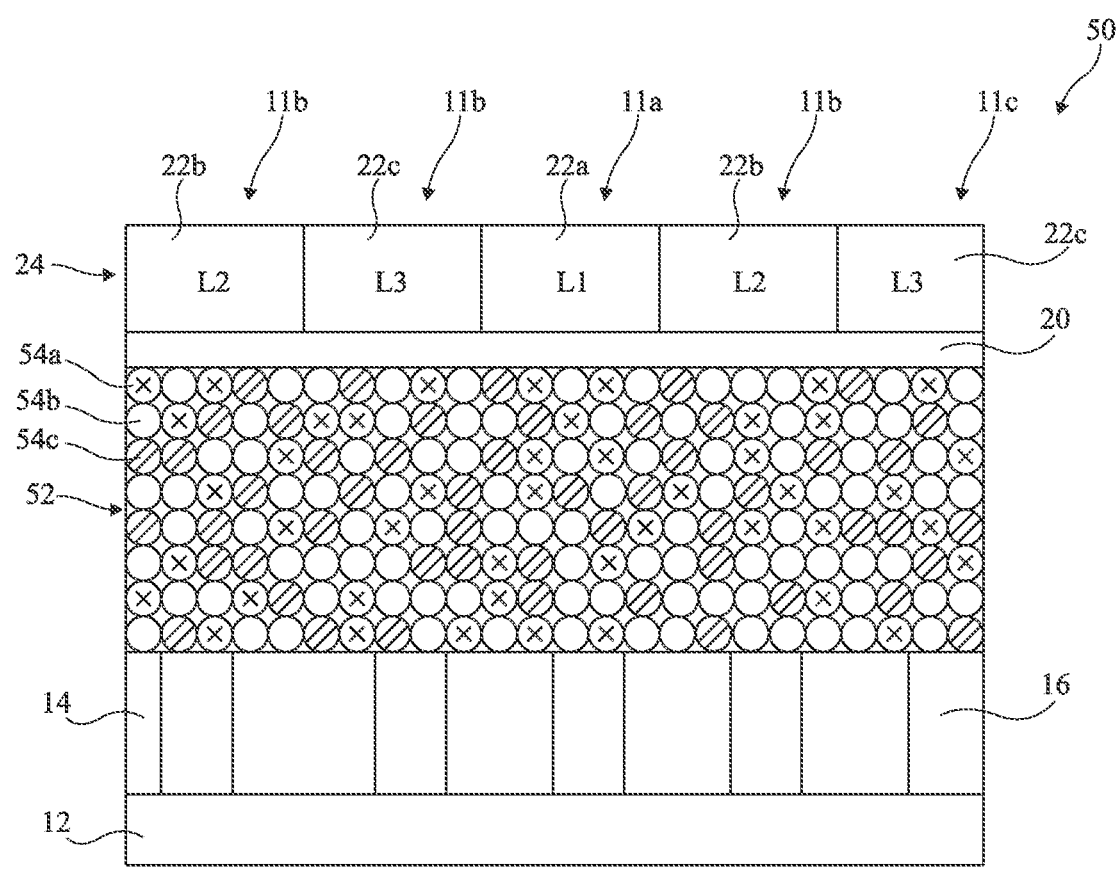
FIG. 5 illustrates another embodiment of a multispectral imager.

FIG. 5 illustrates another embodiment of a multispectral imager 50.

The imager 50 comprises the elements of the imager 10 of FIG. 2. Those elements will not be described again. The imager 50 differs from the imager 10 of FIG. 2 in that the layer 18 is replaced by a quantum dot-based layer 52.

Like the layer 18, the layer 52 extends from the layer 20 to the layer 14 and the vias 16. The layer 52 is preferably in contact with the vias 16.

The layer 52 is made of quantum dots. Preferably, the quantum dots are fixed together and to the layer 14 by a resin, or a matrix. Preferably, the layer 52 comprises only the quantum dots and the resin.

The layer 52 comprises several types of quantum dots. The layer 52 comprises preferably as many types of quantum dots as the number of working wavelengths of the imager 50. In the example of FIG. 5, the imager has three working wavelengths. The layer 52 comprises quantum dots 54a (represented by circles around a cross) which are configured to produce electrical charges given the incidence of photons of the working wavelength L1. The layer 52 comprises quantum dots 54b (represented by empty circles) which are configured to produce electrical charges given the incidence of photons of the working wavelength L2. The layer 52 comprises quantum dots 54c (represented by circles around two parallel segments) which are configured to produce electrical charges given the incidence of photons of the working wavelength L3.

The quantum dots 54a, 54b and 54c are preferably different from each other. Therefore, the size and/or the composition of the quantum dots 54a, 54b or 54c are preferably different from the size and/or the composition of the other types of quantum dots.

Each type of quantum dots 54a, 54b, 54c is configured to produce electrical charges upon reception of light of the working wavelength of the corresponding pixel 11a, 11b, 11c. The quantum dots 54a are configured to produce electrical charges upon reception of light of the working wavelength L1. The quantum dots 54b are configured to produce electrical charges upon reception of light of the working wavelength L2. The quantum dots 54c is configured to produce electrical charges upon reception of light of the working wavelength L3.

The quantum dots 54a are, for example, quantum dots having the preferred curve for the generation of charges at the wavelength L1, in other words the quantum dots corresponding to the curve C0 of FIG. 1, if the wavelength L1 is equal to 950 nm. Preferably, the quantum dots 54a are quantum dots whose curve of absorbance has a maximum, for example a local maximum at the wavelength L1. Alternatively, the quantum dots 54a are quantum dots having an absorbance for the wavelength L1 higher than the absorbance for the wavelength L1 of the quantum dots corresponding to the preferred curve for the wavelength L1, here the curve C0, for example the quantum dots corresponding to any of curves C3 to C13.

Similarly, the quantum dots 54b are, for example, quantum dots having the preferred curve for the generation of charges at the wavelength L2, in other words the quantum dots corresponding to the curve C2 of FIG. 1, if the wavelength L2 is equal to 1200 nm. Preferably, the quantum dots 54b are quantum dots whose curve of absorbance has a maximum, for example a local maximum at the wavelength L2. Alternatively, the quantum dots 54b are quantum dots having an absorbance for the wavelength L2 higher than the absorbance for the wavelength L2 of the quantum dots corresponding to the preferred curve for the wavelength L2, here the curve C2, for example the quantum dots corresponding to any of curves C7 to C13.

Similarly, the quantum dots 54c are, for example, quantum dots having the preferred curve for the generation of charges at the wavelength L3, in other words the quantum dots corresponding to the curve C5 of FIG. 1, if the wavelength L3 is equal to 1450 nm. Preferably, the quantum dots 54c are quantum dots whose curve of absorbance has a maximum, for example a local maximum at the wavelength L3. Alternatively, the quantum dots 54c are quantum dots having an absorbance for the wavelength L3 higher than the absorbance for the wavelength L3 of the quantum dots corresponding to the preferred curve for the wavelength L3, here the curve C5, for example the quantum dots corresponding to any of curves C11 to C13.

The arrangement of quantum dots in layer 52 is, for example, random. Each pixel 11a, 11b, 11c comprises quantum dots 54a, 54b and 54c. The arrangement of quantum dots in layer 52 is for example homogenous in all the pixels. In other words, the concentration of quantum dots of any type is, for example, substantially identical in all pixels 11a, 11b, 11c. In other words, the proportion of quantum dots 54a is, for example, substantially identical in the pixels 11a, in which the quantum dots 54a generate charges, and in the pixels 11b and 11c, in which the quantum dots 54a do not generate charges. Similarly, the proportion of quantum dots 54b is, for example, substantially identical in the pixels 11b, in which the quantum dots 54b generate charges, and in the pixels 11a and 11c, in which the quantum dots 54b do not generate charges. Similarly, the proportion of quantum dots

54c is, for example, substantially identical in the pixels 11c, in which the quantum dots 54c generate charges, and in the pixels 11a and 11b, in which the quantum dots 54c do not generate charges.

In a same pixel, the concentrations of quantum dots 54a, 54b and 54c can be identical. Alternatively, the concentrations of quantum dots 54a, 54b and 54c can be different.

Figure 6:
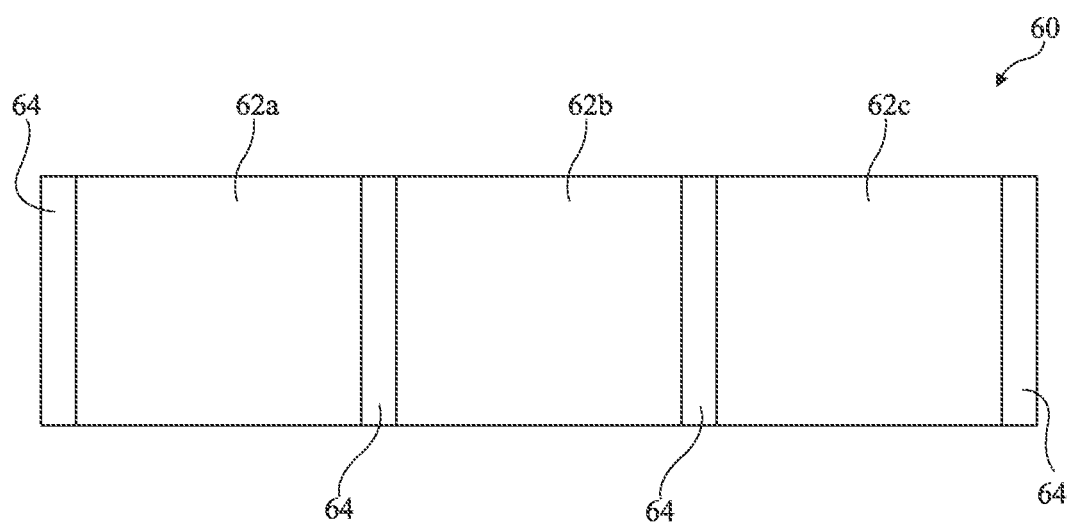
FIG. 6 illustrates an embodiment of a spectral filter.

FIG. 6 illustrates an embodiment of a spectral filter 60. The filter 60 can, for example, be used in the embodiments of FIGS. 2 to 5, in place of the layer 24 of filters 22a, 22b and 22c. Alternatively, the filter can be used on any type of photodetector, for example a silicon-based photodetector.

The filter 60 comprises quantum dot-based regions, preferably at least one quantum dot-based region. In FIG. 6, the filter 60 comprises three regions 62a, 62b and 62c. The filter 60 comprises at least one type of regions. In the example of FIG. 6, the regions 62a, 62b and 62c correspond to three types of regions. Each type of regions corresponds to a wavelength or a range of wavelengths. In other words, each type of regions is configured to transmit a wavelength or a range of wavelengths. For example, the region 62a, as well as the regions of the same type as the region 62a, are configured to transmit light with the wavelength L1. Similarly, for example, the region 62b, as well as the regions of the same type as the region 62b, are configured to transmit light with the wavelength L2. Similarly, for example, the region 62c, as well as the regions of the same type as the region 62c, are configured to transmit light with the wavelength L3.

Each region 62a, 62b, 62c is, for example, associated to a pixel, for example to a single pixel. Each region 62a, 62b, 62c is, for example, located in regard of the part of the pixel generating the charges. Each region is, for example, located between the source of light and said part.

Each pixel 11a comprises a region 62a. Each pixel 11b comprises a region 62b. Each pixel 11c comprises a region 62c. Each region 62a, 62b, 62c for example extends in regard of at least the entirety of the part of the pixel generating the charges.

Each region 62a, 62b, 62c is made of quantum dots. The quantum dots of each region are fixed together, for example by a resin, or a matrix. Preferably, each region 62a, 62b, 62c comprises only the quantum dots and the resin. The quantum dots of each region 62a, 62b, 62c are preferably identical. The quantum dots of each of the regions 62a, 62b, 62c are preferably different from the quantum dots of the other types of regions 62a, 62b, 62c. Therefore, the size and/or the composition of the quantum dots of each of the regions 62a, 62b, 62c are preferably different from the size and/or the composition of the quantum dots of the other regions 62a, 62b, 62c.

The different regions 62a, 62b, 62c are, for example, separated from each other by walls 64. The walls 64 are, for example, opaque, preferably opaque to all wavelengths.

In an embodiment in which each region 62a, 62b, 62c is, for example, configured to let a range of wavelength, said range is, for example, the range D3 of the absorbance curve of FIG. 1 for the quantum dots of the region. In this case, for a pixel having a filter region 62a, 62b, 62c in quantum dots of a given size and a given composition, the voltage measured between the electrodes is representative of the quantity of light having a wavelength higher than the wavelength corresponding to the maximum A2.

To obtain a voltage representing a specific range of wavelength, the imager comprises, for example, a first pixel generating a voltage representing the light having a wavelength higher than the lowest value of the specific range, a second pixel generating a voltage representing the light having a wavelength higher than the highest value of the specific range and a circuit configured to subtract the voltage generated by a second pixel to the voltage generated by the first pixel. For example, the first pixel comprise a filter region made of quantum dots having a maximum absorbance value A2, as defined in relation with FIG. 1, substantially equal to the lowest value of the specific range. For example, the second pixel comprise a filter region made of quantum dots having a maximum absorbance value A2, as defined in relation with FIG. 1, substantially equal to the highest value of the specific range.

An advantage of the described embodiments is that they can measure the quantity of light in a large range of wavelength, as it is possible to find quantum dots having a high absorbance in a large range of wavelength.

Various embodiments and variants have been described. Those skilled in the art will understand that certain features of these embodiments can be combined and other variants will readily occur to those skilled in the art. In particular, while the embodiments are described for an imager having three working wavelength, the imager can have any number of working wavelengths.

Finally, the practical implementation of the embodiments and variants described herein is within the capabilities of those skilled in the art based on the functional description provided hereinabove.

The invention claimed is:

1. A device, comprising:
a first layer made of semiconductor nanoparticle quantum dots fixed in an insulating resin material, each semiconductor nanoparticle quantum dot comprising a semiconductor core surrounded by a shell configured to passivate the semiconductor core;
a second layer made of a conductive material resting on the first layer;
a third layer resting on the second layer, said third layer including at least two filter regions, the at least two filter regions being configured to transmit distinct wavelengths;
a fourth layer below the first layer, said fourth layer including a conductive via aligned with each filter region of said at least two filter regions;
wherein the first layer is configured to generate charges upon reception of said wavelengths; and
wherein said charges produce a voltage between the second layer and each conductive via of the fourth layer.

2. The device according to claim 1, comprising at least two pixels, wherein each pixel includes at least one filter region and a part of the first layer.

3. The device according to claim 2, wherein the first layer is shared by all the pixels.

4. The device according to claim 2, wherein the fourth layer includes an insulating layer surrounding said conductive vias, wherein said part of the first layer for each pixel rests on the conductive via.

5. The device according to claim 1, wherein the semiconductor nanoparticle quantum dots of the first layer comprise semiconductor nanoparticle quantum dots having a same composition with different sizes corresponding to distinct wavelengths, each semiconductor nanoparticle quantum dot configured to generate charges upon reception of light of one of said distinct wavelengths.

6. The device according to claim 5, wherein the different types of semiconductor nanoparticle quantum dots are mixed together in the first layer.

7. The device according to claim 1, wherein the semiconductor nanoparticle quantum dots of the first layer are substantially identical and are able to generate charges upon reception of light of all the distinct wavelengths.

8. The device according to claim 1, wherein the first layer is formed by a stack of semiconductor nanoparticle quantum dot layers, at least two semiconductor nanoparticle quantum dot layers being included in the stack and configured to generate charges upon reception of different wavelengths among the distinct wavelengths.

9. The device according to claim 8, comprising at least two pixels, wherein each pixel includes at least one filter region and a part of the first layer, wherein the first layer is shared by all the pixels, and wherein each pixel comprises a part of each third layer of the first layer.

10. The device according to claim 1, comprising at least two pixels, wherein each pixel includes at least one filter region and a part of the first layer, and wherein the parts of the first layer in each pixel are identical.

11. The device according to claim 1, comprising at least two pixels, wherein each pixel includes at least one filter region and a part of the first layer, and wherein the part of the first layer in each pixel is a region configured to generate charges upon reception of the wavelength transmitted by the filter of the pixel.

12. The device according to claim 1, wherein each filter region is made of quantum dots.

13. A multispectral imager comprising a device according to claim 1.

* * * * *